United States Patent [19]
Pascoe

[11] 3,718,822
[45] Feb. 27, 1973

[54] RIVET CENTER DETECTING MECHANISM
[75] Inventor: Larry B. Pascoe, National City, Calif.
[73] Assignee: Rohr Industries, Inc., Chula Vista, Calif.
[22] Filed: April 23, 1971
[21] Appl. No.: 136,771

[52] U.S. Cl. .................................. 250/210, 250/222
[51] Int. Cl. ........................... G06m 7/00, H01j 39/12
[58] Field of Search ....................... 250/209, 210, 222

[56] References Cited
UNITED STATES PATENTS
3,348,057  10/1967  Burroughs ....................... 250/210 X

*Primary Examiner*—James W. Lawrence
*Assistant Examiner*—T. N. Grigsby
*Attorney*—George E. Pearson

[57] ABSTRACT

To determine whether or not a rivet has been delivered to, and is properly centered between, the rivet holding fingers of an automatic riveting machine, a light beam is directed from a light source on one side of a selected rivet position, past such selected position toward two photocells, so positioned that both photocells are fully exposed to the beam when the fingers are empty; both photocells are shielded equally from the beam when a rivet is held in properly centered position between the fingers; and one of the photocells is exposed to the beam to a greater degree than the other when a rivet is in improperly centered position between the fingers. The photocells are embodied in a bridged circuit having three detectors responsive thereto, the detectors being actuated selectively according to the relatively illuminated condition of the photocells.

7 Claims, 9 Drawing Figures

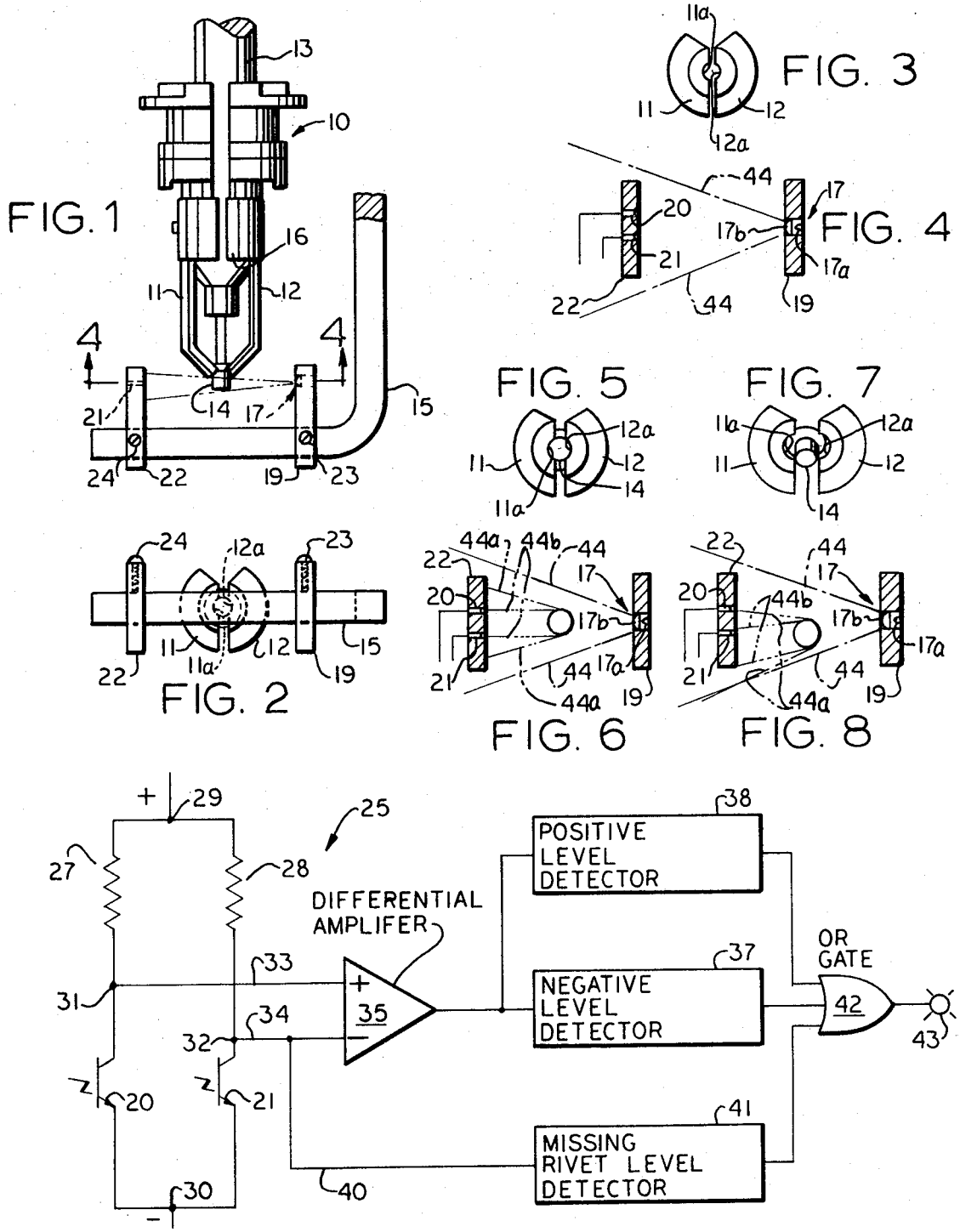

RIVET CENTER DETECTING MECHANISM

BACKGROUND OF THE INVENTION

As far as is known, detection of the failure of an automatic riveting machine to feed a rivet to properly centered position between the rivet holding fingers of such machine is the responsibility of the human operator of the machine.

SUMMARY OF THE INVENTION

A primary objective of the present invention is to detect an absent or improperly centered object in a known field. In the illustrative embodiment of the invention a light beam is directed toward two photocells which are embodied in opposite sides of a bridged circuit, said photocells being so located and arranged that when an opaque object of selected width is in centered relation at a known point between the light source and the photocells, both photocells will be shielded equally from the light of the beam; when such object is interposed in improperly centered relation in the beam, one of the photocells is shielded more than the other from the light of the beam; and when no such object is so interposed, both photocells are fully exposed to the light of the beam. The bridged circuit is responsive to the various degrees of illumination to which the photocells are thus exposed to selectively control operation of an associated set of detectors so as to detect each of the foregoing conditions.

BRIEF DESCRIPTION OF THE DRAWINGS

The objectives and advantages of the invention will be apparent from the following description and the accompanying drawings, wherein:

FIG. 1 is a fragmentary, somewhat diagrammatic, side elevational view of the setting head of an automatic riveting machine with a light beam and photocell mechanism associated therewith.

FIG. 2 is a bottom view of FIG. 1.

FIG. 3 is a bottom view of the rivet holding fingers of FIGS. 1 and 2 showing the rivet holding fingers empty.

FIG. 4 is a diagrammatic, sectional view taken as along line 4—4 of FIG. 1, but showing the rivet holding fingers empty, as in FIG. 3, the uninterrupted light beam being indicated in dash-one-dot lines.

FIG. 5 is a view similar to FIG. 3, but showing a rivet seated in properly centered position in the recesses in the fingers.

FIG. 6 is a diagrammatic view similar to FIG. 4, but showing the photocells equally shielded from the beam by a rivet properly centered in the finger recesses as in FIGS. 1 and 5.

FIG. 7 is a view similar to FIGS. 3 and 5, but showing a rivet canted to improperly centered position between the fingers.

FIG. 8 is a view similar to FIGS. 4 and 6, but showing a cocked or improperly centered rivet, as in FIG. 7, shielding one of the photocells more than the other.

FIG. 9 is a schematic circuit drawing of a bridged circuit with the photocells embodied therein, and controlling the associated detectors.

DETAILED DESCRIPTION OF THE DRAWINGS

Referring to the drawings in detail, a well known type of rivet setting machine, marketed under the trademark DRIVMATIC, has a setting head 10 comprising a pair of rivet holding fingers 11 and 12, and a reciprocally driven setting plunger 13. Suitable biasing means, such as an encircling, c-shape spring band 16, urges the fingers toward each other to hold a rivet inserted therebetween. As is well known to those familiar with this type of mechanism, the setting head 10 is actuated to travel back and forth along a path substantially perpendicular to the paper upon which the drawings are made, i.e. toward and away from the viewer, between a first position wherein a rivet 14 is fed into position between the fingers 11 and 12, and a second position wherein the rivet 14, if properly centered between the fingers, is fed into a properly aligned hole in a workpiece, not shown, and is set by a downward stroke of the setting plunger 13 against the usual anvil, not shown, of the riveting machine.

To insure that the rivet setting procedure will be aborted in the event that (1) the rivet holding fingers 11 and 12 are empty, or (2) a rivet is not properly centered between the fingers, a support bar 15 is fixedly mounted by conventional means on the frame, not shown, of the rivet setting machine upon which the setting head 10 is mounted.

A suitable light beam projector 17, comprising, for example a small electric light bulb 17a, preferably with a conventional focusing lens 17b, is mounted in a hole provided in a block 19 of suitable material such as micarta, mounted for slidable adjustment on a straight portion of the bar 15 directly beneath, and transversely of, the projected axis of a rivet 14 properly centered between a pair of complementary recesses 11a and 12a provided in the fingers 11 and 12, respectively.

Two small photocells 20 and 21, preferably of the photosensitive transistor type, are mounted facing the light projector 17 in laterally separated holes provided in a second block 22, also mounted for slidable adjustment on the bar 15 similarly to the block 19. Set screws 23 and 24 provided in the blocks 19 and 22, respectively, allow the blocks to be secured in adjusted position on the bar. Resistance through the illustrative photocells 20 and 21 varies inversely in relation to the intensity of the light to which they are exposed.

The bridged electronic circuit 25, see FIG. 9, is simple, comprising well known components labeled in their respective boxes. The structure of the circuit will be apparent to one familiar with such circuitry from the following description of the operation of the invention. The specific type of circuit employed is not material to the present invention, and the term "bridged circuit" as used herein is intended to mean any electrical or electronic circuit suitable for the purpose as set forth herein.

OPERATION

With the photocells 20 and 21 embodied in one side of the circuit 25 as shown in FIG. 9, and a pair of fixed resistors 27 and 28 of equal resistance embodied in the other side of the circuit, an electric battery or other suitable source of direct current is connected to the circuit at terminals 29 and 30. The mid-point terminals 31 and 32 are connected by conductors 33 and 34, respectively through a null point differential amplifier 35 to one side of a negative level detector 37 and also to one side of a positive level detector 38. A bypass conductor 40 is connected from the conductors 34 to one side of a missing rivet level detector 41. The other sides of the three detectors 37, 38 and 41 are all connected to an OR gate 42, which in turn may be operatively connected to a conventional signal 43, or to a relay, not shown, for actuation of other mechanism if desired. Such other mechanism may be, for example, mechanism for clearing the fingers 11 and 12 and feeding another rivet thereto, or for stopping rivet setting machine until the detected malfunction is cleared by a human operator. Since such additional mechanism can be readily devised by an ordinarily skilled designer or engineer familiar with automatic riveting equipment, and is not a part of the present invention, it is omitted.

Prior to starting the rivet setting machine in which the invention is embodied, the blocks 19 and 22 are so adjusted on the bar 15, that with a rivet 14 centered in the rivet holding fingers 11 and 12 as shown in FIG. 6, the umbra or darkest shadow portion cast by the rivet 14, and defined by the dash-three-dot lines 44b, will just cover the two photocells 20 and 21. The penumbra, or intermediate shadow portion, lies in the zone between the dash-three-dot lines 44b and the dash-two-dot lines 44a, while the fully illuminated portion of the beam lies in the zone between the dash-two-dot lines 44a and the dash-one-dot lines 44.

In the event that a rivet 14 is seated in properly centered position in the recesses 11a and 12a of the holding fingers 11 and 12, both photocells 20 and 21 are equally shielded from the beam 44 as shown in FIG. 6. There is thus zero difference in the resistance of the two photocells and no output from the differential amplifier 35. Also, since the unilluminated photocells offer high resistance to the flow of current through conductor 40 and the missing rivet level detector 41, no current flows through the OR gate 42 and the signal 43 remains unactuated.

In the event that the rivet holding fingers 11 and 12 are empty, both photocells 20 and 21 are fully and equally illuminated by the light of the beam as shown in FIG. 4. There is thus again zero difference in the resistance of the two photocells, and no output from the differential amplifier 35. However, since the resistance of photocell 21 is lowered by the high intensity light of the beam 44 to which it is thus exposed, negative current flows through conductor 40 and the missing rivet level detector 41 and thence through the OR gate 42 to detect a first "no go" situation and actuate signal 43.

In the event that a rivet 14 is cocked or improperly centered position between the fingers as shown in FIG. 7, one of the photocells 20 or 21 is thereby exposed to the light of the beam 44 to a greater degree than the other photocell which is at least partially shielded from the beam by the improperly centered rivet 14. As shown in FIG. 8, the photocell 20 is thus exposed to the light of beam 44 to a greater degree than the photocell 21, which is shielded. In this case, therefore, the circuit 25 is unbalanced by the variation in resistance of the two photocells caused by such uneven illumination, and current thereupon flows through the differential amplifier 35, either the positive level detector 38 or the negative level detector 37 as the case may be, and the OR gate 42 to actuate signal 43.

The invention provides a simple and positive mechanism for detecting a malfunction in the rivet feeding operation of an automatic riveting machine.

Having thus described my invention, what I claim as new and useful and desire to protect by U. S. Letters Patent is:

1. Center detector mechanism for detecting, respectively, the centered, uncentered, or absence condition of an object of known size with respect to a beamed field having a known center and beam width, said mechanism comprising means for setting up said beamed field, means for holding and positioning the object normally in properly centered position in said field at a predetermined position therein wherein the object size has a predetermined relation to the beam width, variable resistance means for sensing the intensity of the beamed field which passes said predetermined position therein, said sensing means being actuated to a first known resistance condition by the absence of such object from the beamed field, to a second known resistance condition by the presence of such object in improperly centered position in the field, and to a third known condition by the presence of the object in properly centered position in the field, a bridged circuit embodying said sensing means, said circuit being balanced with the sensing means in its first and third known resistance conditions, and unbalanced with the sensing means in its second known resistance condition, detector means responsive to said first and second conditions of the sensing means, and means actuated by said detector means for indicating said first and second conditions of the sensing means, said third condition of said sensing means being indicated by nonactuation of said indicating means.

2. Center detector mechanism as defined in claim 1 wherein separate detector means is responsive to each unbalanced condition of the circuit.

3. Center detector mechanism as claimed in claim 2 wherein the sensing means comprises a light source directing a beam of light toward such object centered in such field, and a pair of photocells incorporated in opposite sides of such circuit and mounted beyond such centered object from the light source, said photocells spaced equally on opposite sides of a line from the light source through the center of such object, said photocells being located to be equally shielded from the light from the light source by such object properly centered in such field, to be unequally shielded from the light from the light source by such object improperly centered in such field, and to be fully exposed to the light from such light source with such object absent from such field.

4. Center detector mechanism as claimed in claim 1 wherein the object is a rivet and the mechanism is for an automatic riveting machine having a pair of rivet holding fingers for receiving a rivet of known size in properly centered relation therebetween, and means biasing the fingers toward each other to rivet holding position.

5. Rivet center detector mechanism as claimed in claim 4 wherein the variable resistance sensing means comprises a light source directing a beam of light toward the axis of such rivet in properly centered position between the fingers, and a pair of photocells incorporated in opposite sides of said circuit and mounted beyond such properly centered rivet from the light source, said photocells spaced equally on opposite sides of a line from the light source through the axis of such properly centered rivet, said photocells being located to be equally shielded from the light from said light source by such properly centered rivet, to be unequally shielded from the light from said light source by such rivet improperly centered between the fingers, and to be fully exposed to the light from said light source when said fingers are empty.

6. Rivet center detector mechanism as claimed in claim 5 wherein the rivet holding fingers have opposed, complementary recesses therein for receiving a rivet of known size in properly centered, position between the fingers and in seated relation in the recesses.

7. A rivet center detector as claimed in claim 5 wherein the photocells are mounted substantially on the boundary zone between the umbra and penumbra of a shadow cast by such properly centered rivet.

* * * * *